United States Patent Office 3,414,514
Patented Dec. 3, 1968

3,414,514
PROCESS OF DEWATERING A CONCENTRATED SEWAGE SLURRY
Frank C. Buhl, Birmingham, Mich., assignor to Hercules Incorporated, Wilmington, Del., a corporation of Delaware
No Drawing. Filed Nov. 15, 1966, Ser. No. 594,398
9 Claims. (Cl. 210—54)

The present invention relates to an improved process of treating sewage and more particularly to a process of dewatering sewage sludge.

The disposal of solids after sewage treatment has always been a problem. At one time some plants simply discharged sewage sludge into nearby streams. Then, as pollution increased, many plants began to barge the sewage to seat or lagoon it in large evacuated areas. Finally most plants turned to vacuum filtration as a satisfactory means of separating sewage solids from slurries and either incinerating these solids or using them in land fill or as fertilizer, and this concentration or substantially dewatering of the sewage solids is necessary before they can be effectively used or discarded in the manner indicated.

In a typical sewage treatment plant the steps involved often include, in the order given, (1) primary sedimentation (usually after coarsely screening the raw sewage slurry through grit separators), (2) aeration, (3) digestion, (4) elutriation, (5) vacuum filtration, and (6) incineration or other disposal or end use of the sewage solids. However vacuum filtration may be employed at any one of a number of places in a sewage treatment plant, e.g. after steps 1, 2, 3 or 4, and the present invention is applicable to vacuum filtration of sewage irrespective of where it is carried out in a sewage treatment process. The data given in the examples hereinafter were obtained on vacuum filtration after raw sewage had been processed according to steps 1, 2, 3 and 4. However the present invention has also been found to be of substantially equal benefit when it was applied after steps 1, 2 or 3.

The typical vacuum filter employed for sewage treatment includes a large rotary drum covered with an open-mesh metal or fiber filter cloth. As the drum is rotated through the sewage slurry contained in a filter pan below the drum, vacuum is applied by suction toward the center of the drum through the filter cloth. In this manner the sewage solids ("dry sludge cake") are continuously picked up on the filter and removed therefrom by any one of various means such as air pressure or scrapers.

However unless a suitable flocculant (coagulant) is added to the sewage slurry, the sewage solids remain in the form of small and hydrated particles and cannot be vacuum filtered. The flocculant causes the small particles of sewage solids to cling together forming larger flocs which more readily release their bound water when vacuum filtered. Ferric chloride (either alone or in admixture with lime) is the most common flocculant heretofore employed. Other flocculants which have been used heretofore include ferric sulfate, aluminum chloride, and alum. However these flocculants have their drawbacks. Since ferric chloride is an acid salt, the alkalinity in the sewage being treated neutralizes the ferric chloride and makes the ferric ion unavailable for flocculation. Therefore as the alkalinity of the sewage increases the amount of ferric chloride must be increased. Also the acidity of the ferric chloride causes corrosion problems. One disadvantage of lime is that it builds up on the sewage treatment plant equipment and makes frequent cleaning thereof necessary. In addition, since large volumes of the prior art flocculants are required, storage problems also arise.

Recently many sewage treatment plants have replaced the inorganic flocculants with synthetic polyelectrolytes as aids in vacuum filtration. The synthetic polyelectrolytes are substantially more desirable from the standpoint of corrosion and clogging of the equipment, and they are also effective in smaller amounts than prior art inorganic flocculants.

In accordance with the present invention it has been found that contacting sewage with a small amount of a certain acrylamidebeta methacrylyloxyethyltrimethylammonium methyl sulfate (acrylamide-MTMMS) copolymer and vacuum filtering provides a highly effective and economical means of dewatering sewage. The copolymer flocculates the sewage particles and substantially facilitates dewatering by vacuum filtration to give the desired relatively thick and dry sludge cakes in a short period of time as contrasted with much thinner and wetter sludge cakes requiring substantially longer periods of time with prior art flocculants. In general somewhat smaller amounts are required of the copolymer flocculant of the present invention than with prior art flocculants.

The effectiveness of the particular copolymer of the present invention as a flocculant and dewatering aid in the vacuum filtration of sewage has been determined both in the laboratory and in actual processes as experienced in sewage treatment plants.

The following examples illustrate various embodiments of the present invention. These examples are not intended to limit the present invention beyond the scope of the appended claims. In these examples and elsewhere herein parts and percent are by weight unless otherwise indicated.

EXAMPLES 1–8

Laboratory Runs

These runs were carried out in order to determine the effect of various polymeric flocculating agents on the characteristics of suspended solids in sewage sludge during the vacuum filtration step.

250-ml. portions of sewage sludge of 4.8% solids concentration were placed in each of several clean 500 ml. graduated cylinders and diluted by mixing with 250 ml. tap water. Flocculating agent was added to the sewage slurry and mixed therewith by inverting the graduated cylinders 8 times. After allowing to stand each was observed for extent of flocculation as well as size and character of flocs formed.

Further details appear in Table 1 hereinafter.

TABLE 1.—LABORATORY RUNS

Effect of Various Flocculating Agents on the Characteristics of Suspended Solids in Sewage Sludge During Vacuum Filtration

| Ex. No. | Flocculating Agent Name | Amount [a] | Visual Observations After 5 Mins. Standing |
|---|---|---|---|
| 1 | None | None | Black supernatant. |
| 2 | Polyethylenimine | 7,000 | Very hazy supernatant—Extremely small flocs. |
| 3 | {Polyethylenimine [b]<br>{Sulfonated polystyrene [c] | 6,000<br>2,000 | } Do. |
| 4 | Commercial Flocculating Agent [d] | 4,500 | Clear supernatant. |
| 5 | Acrylamide-MTMMS | 1,000 | Slightly hazy supernatant. |
| 6 | do | 1,500 | Clear supernatant. |
| 7 | do | 2,500 | Do. |
| 8 | do | 3,000 | Do. |

[a] P.p.m. dry weight basis by weight of total dry solids in sewage treated, added as a 0.1% aqueous solution.
[b] Flocculating agent available commercially as "Purifloc C-31."
[c] Flocculating agent available commercially as "Purifloc A-21."
[d] An acrylamide-based cationic flocculating agent available commercially as "Primafloc C-7."
Examples 5-8 used 83% Acrylamide-17% MTMMS copolymer.

EXAMPLES 9–27

Laboratory Runs—Filtration

These runs were carried out in order to determine the effect of various polymeric flocculating agents on the filtration characteristics of sewage sludge.

Flocculating agent was added to each of several 250-ml. portions of sewage sludge of 4.8% solids concentration in clean 500 ml. graduated cylinders. Flocculating agent was mixed with the sewage sludge by inverting the graduated cylinders 8 times. The resulting mixtures were poured into Büchner funnels lined with No. 4 Whatman filter paper. A 22-inch mercury vacuum was applied to the funnels and the filtrates collected in 250 ml. graduated cylinders.

Further details appear in Table 2 hereinafter.

TABLE 2.—LABORATORY RUNS—FILTRATION

Effect of Various Flocculating Agents on the Filtration Characteristics of Sewage Sludge

| Ex. No. | Flocculating Agent Name | Amount [a] | Ml. Filtrate After 5 Mins. |
|---|---|---|---|
| 9 | None | None | 12 |
| 10 | Polyethylenimine | 5,000 | 60 |
| 11 | do | 7,000 | 120 |
| 12 | 94% Acrylamide-6% MTMMS | 50 | 14 |
| 13 | do | 1,000 | 24 |
| 14 | do | 2,000 | 104 |
| 15 | do | 3,000 | 150 |
| 16 | do | 5,000 | 170 |
| 17 | do | 10,000 | 212 |
| 18 | 83% Acrylamide-17% MTMMS | 1,000 | 18 |
| 19 | do | 2,000 | 70 |
| 20 | do | 3,000 | 147 |
| 21 | do | 5,000 | 180 |
| 22 | do | 10,000 | 231 |
| 23 | 60% Acrylamide-40% MTMMS | 1,000 | 29 |
| 24 | do | 2,000 | 120 |
| 25 | do | 3,000 | 174 |
| 26 | do | 5,000 | 221 |
| 27 | do | 10,000 | 233 |

[a] P.p.m. dry weight basis by weight of total dry solids in sewage treated, added as a 0.1% aqueous solution.

EXAMPLES 28–33

Laboratory Runs—Filter Leaf Tests

These runs were carried out in order to determine the effect of various flocculating agents on the "pickup" characteristics of sewage sludge.

1-liter portions of sewage sludge of 4.8% solids concentration were placed in each of several clean glass beakers. Flocculating agent was added to and mixed with each portion by pouring 8 times back and forth from filled beaker to empty beaker. A conventional filter leaf with filter cloth attached (this is conventional testing equipment in this art) was inverted into the sewage slurry in the beaker and held for 1 minute. The filter leaf was then removed from the beaker and held upright for a drying time of 2 minutes. A 22-inch mercury vacuum was applied to the filter leaf throughout the tests.

Further details appear in Table 3 hereinafter.

TABLE 3.—LABORATORY RUNS—FILTER LEAF TESTS

Effect of Various Flocculating Agents on the "Pickup" Characteristics of Sewage Sludge

| Ex. No. | Flocculating Agent Name | Amount [a] | Visual Observations of Filter Cake |
|---|---|---|---|
| 28 | None | None | Slurry, thin. Black supernatant containing fine solids in suspension. |
| 29 | {FeCl₃<br>{CaO | 30,000<br>120,000 | } Dry, thick. |
| 30 | Polyethylenimine | 4,500 | Dry, thin. |
| 31 | Acrylamide-MTMMS | 500 | Do. |
| 32 | do | 750 | Very dry, very thick. |
| 33 | do | 1,000 | Wet, very thick. |

[a] P.p.m. dry weight basis by weight of total dry solids in sewage treated, added as a 0.1% aqueous solution.
Examples 31-33 used 83% Acrylamide-17% MTMMS copolymer.

EXAMPLES 34–37

Sewage Plant Runs—Filtration

These runs were carried out in order to determine the effect of various flocculating agents on the filtration characteristics of sewage sludge.

The flocculating agent was added to the sewage treatment plant stream by mixing the flocculating agent with sewage sludge after the elutriation step and pumping the resulting mixture into the filter pan of the rotary vacuum filter employed in the vacuum filtration step.

As will be seen from Table 4 hereinafter the particular copolymer of the present invention gave substantially higher production rates at far lower concentrations than the conventional FeCl₃—CaO flocculating agent.

Further details appear in Table 4 hereinafter.

TABLE 4.—SEWAGE PLANT RUNS—FILTRATION

Effect of Various Flocculating Agents on the Filtration Characteristics of Sewage Sludge

| Ex. No. | Flocculating Agent Name | Amount [a] Lbs. | Amount [a] Percent | Percent Solids in Influent Sludge | Dry Solids Yield, lbs./sq. ft. filter/hr. | Total Dry Solids Produced, lbs. |
|---|---|---|---|---|---|---|
| 34 | FeCl₃—CaO | 3,189—18,336 | 1.60—9.2 | 10.8 | 3.80 | 199,300 |
| 35 | FeCl₃—CaO | 2,892—17,930 | 1.50—9.3 | 11.0 | 3.71 | 192,800 |
| 36 | Acrylamide-MTMMS | 13.9 | 0.11 | 10.7 | 5.08 | 12,700 |
| 37 | Acrylamide-MTMMS | 28.9 | 0.11 | 11.7 | 4.79 | 26,300 |

[a] Dry weight basis by weight total dry solids in sewage treated, added as 1.0% aqueous solution.
Examples 36 and 37 used 83% acrylamide-17% MTMMS copolymer.

From the foregoing examples it will be readily apparent that the particular copolymer flocculating agent of the present invention, as compared with typical flocculating agents of the prior art, gives substantially better performance (even at lower concentrations) from the standpoint of flocculation, settling, and filtration. The amount of copolymer flocculating agent of the present invention may vary widely and depends in part on the particular type of sewage being treated and also on the particular place at which the flocculating agent is introduced into the sewage treatment process. It has been successfully varied within the range of about 50–10,000; in several cases it has been varied within the range of about 1000–5000 and in some instances within the range of about 1000–2500 p.p.m. dry weight basis by weight of the total dry solids in the sewage treated. Those skilled in the art to which this invention relates will appreciate that sewage systems vary tremendously and that the amount of any given flocculating agent employed will vary accordingly. The foregoing examples were carried out on the same sewage system.

The copolymer flocculating agent of the present invention consists by weight thereof essentially of 99%–20% acrylamide and 1%–80% MTMMS, preferably 97%–50% acrylamide and 30%–50% MTMMS, 95%–60% acrylamide and 5%–40% MTMMS being specifically preferred.

Preparation of the particular copolymer employed in the present invention is not claimed herein nor is it per se a part of the present invention. However, the preparation of said copolymer is quite important. In fact, applicant knows of only one process which will produce a product having the properties of the particular copolymer applicable in the present invention. For the sake of completeness this process will now be disclosed. It may be referred to as precipitation polymerization.

The precipitation process broadly comprises polymerizing a solution of acrylamide and MTMMS monomers in aqueous tertiary butanol, aqueous acetone or aqueous tertiary butanol—acetone in the substantial absence of air while agitating the solution to give a copolymer product that can be isolated by filtration, the aqueous tertiary butanol and aqueous acetone being solvents for the monomers but nonsolvents for the copolymer product.

Several of the conditions of this precipitation polymerization process are critical, and these conditions will now be discussed.

The solvent for the monomers must be aqueous tertiary butanol, aqueous acetone or aqueous tertiary butanol-acetone (i.e. mixtures of water with tertiary butanol or acetone alone or with both). The concentrations of water in said mixtures must be 30%–65%, preferably 45%–60%, by weight of said mixtures.

The polymerization reaction temperature must be 0° C.–60° C., preferably 0° C.–40° C.

The polymerization may be carried out either in the presence or absence of a polymerization catalyst (initiator), but preferably a polymerization initiator will be used. Both the types and amounts of free radical initiator applicable are well known in this art. Peroxygen compounds are quite suitable, including e.g. ammonium persulfate, potassium persulfate and hydrogen peroxide. Other free radical initiators include e.g., $\alpha,\alpha'$-azo-bis-isobutyronitrile. The peroxygen initiators may be used alone or in combination with activators (also well known in this art) including e.g. sodium bisulfite, sodium thiosulfate, tetramethylenediamine, thiourea and ferrous chloride, said combination forming a redox system. The amount of initiator usually will not exceed 0.5%, preferably is 0.05%–0.2%, 0.05% being specifically preferred, by weight of the combined weight of monomers.

Although not necessary, preferably the precipitation polymerization is carried out in the presence of a salt dissolved in the polymerization reaction mixture. By polymerizing in the presence of a salt, or a buffer system comprising one or more salts in combination with another material to complete the buffer system, recovery of the copolymer product is substantially facilitated. These salts and buffer systems include, e.g., (1) alkali metal and ammonium acetates, carbonates, bicarbonates, chlorides, phosphates, sulfates, bisulfates, borates; (2) buffer systems comprising (a) mixtures of weak acid or weak base and their salts including (b) phthalates, citrates, borates, phosphates, acetates, ammonium hydroxide, ammonium acetate, ammonium chloride, (c) specific combinations including mixtures of boric acid-borax, citric acid-sodium acid phosphate, sodium carbonate—sodium bicarbonate, ammonium chloride-ammonium hydroxide, ammonium acetate-ammonium hydroxide; or (3) any combination of (1), and (2).

The amount of salt which may be used is about 0.1%–2.0%, preferably about 0.2%–0.7%, by weight of the reaction mixture. If the amount of salt exceeds about 2.0%, usually there is a tendency for the granules of the polymeric product to agglomerate in the polymerization reaction mixture. The manner of adding the salt and the point at which it is added are not critical.

The following is a specific example wherein the precipitation process was used in preparing the particular copolymer applicable in the present invention.

To a glass reactor were charged 116 parts of distilled water, 104 parts of acrylamide, 129 parts of tertiary butanol, 3.9 parts of Tergitol NP–14 (nonylphenyl polyethylene glycol ether), 92.4 parts of a 23% aqueous solution of MTMMS, and 0.05 part of potassium persulfate. The pH was adjusted to 5.3 by addition of $NH_4OH$. The solution was heated to 45° C. The atmosphere and dissolved air were replaced with nitrogen by a series of evacuations and repressurizations. The pressure was then adjusted to 148 mm. to maintain reflux at 45° C. Then 6.26 parts of a 1% aqueous solution of tetramethylethylenediamine was added at a uniform rate during 1.5 hours. Refluxing the reaction mixture was continued for an additional 1.5 hours. Polymerization occurred and the copolymer precipitated during this 3-hour period. The copolymer was washed with acetone and dried in a vacuum oven at 50° C. There was obtained 130 parts of copolymer containing 93.5% solids. It contained 19 weight percent MTMMS and 81 weight percent acrylamide (dry basis).

Although the flocculating agent in accordance with the present invention may be added in dry form to the sewage being treated, it is preferred to add it as an aqueous solution in order to get faster and more complete dispersion thereof throughout the sewage slurry.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of dewatering a concentrated sewage slurry which comprises contacting said sewage slurry with an acrylamide-beta methacrylyloxyethyltrimethylammonium methyl sulfate copolymer, and then dewatering said resulting slurry.

2. Process of claim 1 wherein the copolymer consists by weight thereof essentially of 99%–20% acrylamide and 1%–80% beta methacrylyloxyethyltrimethylammonium methyl sulfate.

3. Process of claim 1 wherein the copolymer consists by weight thereof essentially of 97%–50% acrylamide and 3%–50% beta methacrylyloxyethyltrimethylammonium methyl sulfate.

4. Process of claim 1 wherein the copolymer consists by weight thereof essentially of 95%–60% acrylamide and 5%–40% beta methacrylyloxyethyltrimethylammonium methyl sulfate.

5. Process of dewatering a concentrated sewage slurry which comprises stirring a mixture of said sewage slurry and a small amount of an acrylamide-beta methacrylyloxyethyltrimethylammonium methyl sulfate copolymer, and then dewatering said resulting slurry while continuing to stir same.

6. Process of claim 5 wherein the amount of said acrylamide - beta methacrylyloxyethyltrimethylammonium methyl sulfate copolymer employed is about 50–10,000 p.p.m., dry weight basis by weight of the solids in said slurry.

7. Process of claim 5 wherein the amount of said acrylamide-beta methacrylyloxyethyltrimethylammonium methyl sulfate copolymer employed is about 1,000–5,000 p.p.m., dry weight basis by weight of the solids in said slurry.

8. Process of claim 5 wherein the amount of said acrylamide-beta methacrylyloxyethyltrimethylammonium methyl sulfate copolymer employed is about 1,000–2,500 p.p.m., dry weight basis by weight of the solids in said slurry.

9. Process of claim 5 wherein said dewatering is by vacuum filtration.

References Cited

UNITED STATES PATENTS

| | | |
|---|---|---|
| 2,794,015 | 5/1957 | Jackson et al. |
| 3,171,805 | 3/1965 | Suen et al. _____ 210—54 |
| 3,280,081 | 10/1966 | La Combe et al. |

MICHAEL E. ROGERS, *Primary Examiner.*

UNITED STATES PATENT OFFICE
CERTIFICATE OF CORRECTION

Patent No. 3,414,514 December 3, 1968

Frank C. Buhl

It is certified that error appears in the above identified patent and that said Letters Patent are hereby corrected as shown below:

Column 1, line 17, "sewage to seat" should read -- sewage to sea --.
Column 5, line 24, "30%-50% MTMMS" should read -- 3%-50% MTMMS --.

Signed and sealed this 10th day of March 1970.

(SEAL)
Attest:

Edward M. Fletcher, Jr.           WILLIAM E. SCHUYLER, JR.
Attesting Officer                        Commissioner of Patents